(12) United States Patent
Mizusaki

(10) Patent No.: US 12,634,359 B2
(45) Date of Patent: May 19, 2026

(54) INFORMATION PROCESSING APPARATUS, METHOD, AND NON-TRANSITORY COMPUTER READABLE MEDIUM

(71) Applicant: FUJIFILM Business Innovation Corp., Tokyo (JP)

(72) Inventor: Yutaro Mizusaki, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/181,876

(22) Filed: Mar. 10, 2023

(65) Prior Publication Data

US 2024/0098134 A1 Mar. 21, 2024

(30) Foreign Application Priority Data

Sep. 20, 2022 (JP) ................................. 2022-148711

(51) Int. Cl.
*G06F 15/16* (2006.01)
*H04L 67/02* (2022.01)
*H04L 69/08* (2022.01)

(52) U.S. Cl.
CPC .............. *H04L 67/02* (2013.01); *H04L 69/08* (2013.01)

(58) Field of Classification Search
CPC ................................ H04L 67/02; H04L 69/08
USPC .......................................... 709/230, 200–217
See application file for complete search history.

(56) References Cited

U.S. PATENT DOCUMENTS

| | | | | |
|---|---|---|---|---|
| 6,874,018 | B2 * | 3/2005 | Wu ......................... | G06Q 30/02 |
| | | | | 709/219 |
| 7,114,007 | B2 * | 9/2006 | Sasaki ................... | H04L 67/561 |
| | | | | 709/204 |
| 7,437,772 | B1 * | 10/2008 | Thenthiruperai ..... | H04L 63/102 |
| | | | | 713/153 |
| 7,606,877 | B2 * | 10/2009 | Lee ......................... | H04L 12/14 |
| | | | | 379/114.03 |
| 7,620,700 | B2 * | 11/2009 | Matsushima ........... | H04L 67/02 |
| | | | | 709/219 |
| 7,634,572 | B2 * | 12/2009 | Nanduri .................. | H04L 67/02 |
| | | | | 709/227 |
| 7,647,404 | B2 * | 1/2010 | Cooper .................. | H04L 67/565 |
| | | | | 709/225 |
| 8,151,002 | B2 * | 4/2012 | Suzuki ................... | H04L 61/251 |
| | | | | 709/245 |
| 8,230,004 | B2 * | 7/2012 | Igarashi ................. | H04L 63/08 |
| | | | | 709/238 |
| 8,818,343 | B1 * | 8/2014 | Martin .................... | H04W 4/18 |
| | | | | 455/414.3 |
| 8,880,594 | B2 * | 11/2014 | Dillon ................. | G06F 16/9574 |
| | | | | 709/219 |

(Continued)

FOREIGN PATENT DOCUMENTS

JP          2011-145918 A          7/2011

*Primary Examiner* — Moustafa M Meky
(74) *Attorney, Agent, or Firm* — OLIFF PLC

(57) ABSTRACT

An information processing apparatus includes a processor configured to: transmit a HyperText Transfer Protocol (HTTP) request that matches a request from a requesting entity to a first external service, and receive an HTTP response to the HTTP request; and switch, on the basis of data included in the HTTP response, whether to deliver the HTTP response to the requesting entity or to deliver data obtained by an external conversion device converting the HTTP response to the requesting entity.

7 Claims, 8 Drawing Sheets

(56) References Cited

U.S. PATENT DOCUMENTS

| | | | | |
|---|---|---|---|---|
| 8,909,697 | B2 * | 12/2014 | Dillon | G06F 16/9574 |
| | | | | 725/108 |
| 9,203,817 | B2 * | 12/2015 | Tsujimoto | H04L 63/08 |
| 9,781,175 | B2 * | 10/2017 | Toebes | H04L 67/02 |
| 10,360,276 | B2 * | 7/2019 | Linda | G06F 16/9535 |
| 10,365,873 | B2 * | 7/2019 | Sasaki | H04L 67/34 |
| 10,496,725 | B2 * | 12/2019 | Dillon | G06F 16/9574 |
| 10,680,999 | B2 * | 6/2020 | Mo | H04L 61/4511 |
| 10,999,142 | B1 * | 5/2021 | Mandal | H04L 43/045 |
| 11,330,035 | B2 * | 5/2022 | Li | H04L 65/80 |
| 11,496,363 | B2 * | 11/2022 | Mandal | H04L 43/045 |
| 2001/0013070 | A1 * | 8/2001 | Sasaki | H04L 67/561 |
| | | | | 709/249 |
| 2003/0212759 | A1 * | 11/2003 | Wu | G06Q 30/02 |
| | | | | 709/218 |
| 2005/0229243 | A1 * | 10/2005 | Svendsen | H04L 67/104 |
| | | | | 726/12 |
| 2009/0327113 | A1 * | 12/2009 | Lee | H04L 12/14 |
| | | | | 705/34 |
| 2010/0106777 | A1 * | 4/2010 | Cooper | H04L 67/02 |
| | | | | 709/203 |
| 2011/0134456 | A1 * | 6/2011 | Tsujimoto | H04N 1/4433 |
| | | | | 358/1.13 |
| 2012/0136927 | A1 * | 5/2012 | Dillon | G06F 16/9574 |
| | | | | 709/203 |
| 2012/0137210 | A1 * | 5/2012 | Dillon | G06F 16/9574 |
| | | | | 715/234 |
| 2012/0233464 | A1 * | 9/2012 | Miller | G06Q 30/0601 |
| | | | | 713/168 |
| 2015/0058415 | A1 * | 2/2015 | Toebes | H04L 65/403 |
| | | | | 709/204 |
| 2018/0331997 | A1 * | 11/2018 | Mo | H04L 67/563 |
| 2019/0095162 | A1 * | 3/2019 | Sasaki | H04L 67/34 |
| 2021/0337007 | A1 * | 10/2021 | Li | H04L 67/02 |
| 2021/0409266 | A1 * | 12/2021 | Mandal | H04L 41/22 |
| 2022/0350952 | A1 * | 11/2022 | Xu | H04L 67/146 |

* cited by examiner

FIG. 2

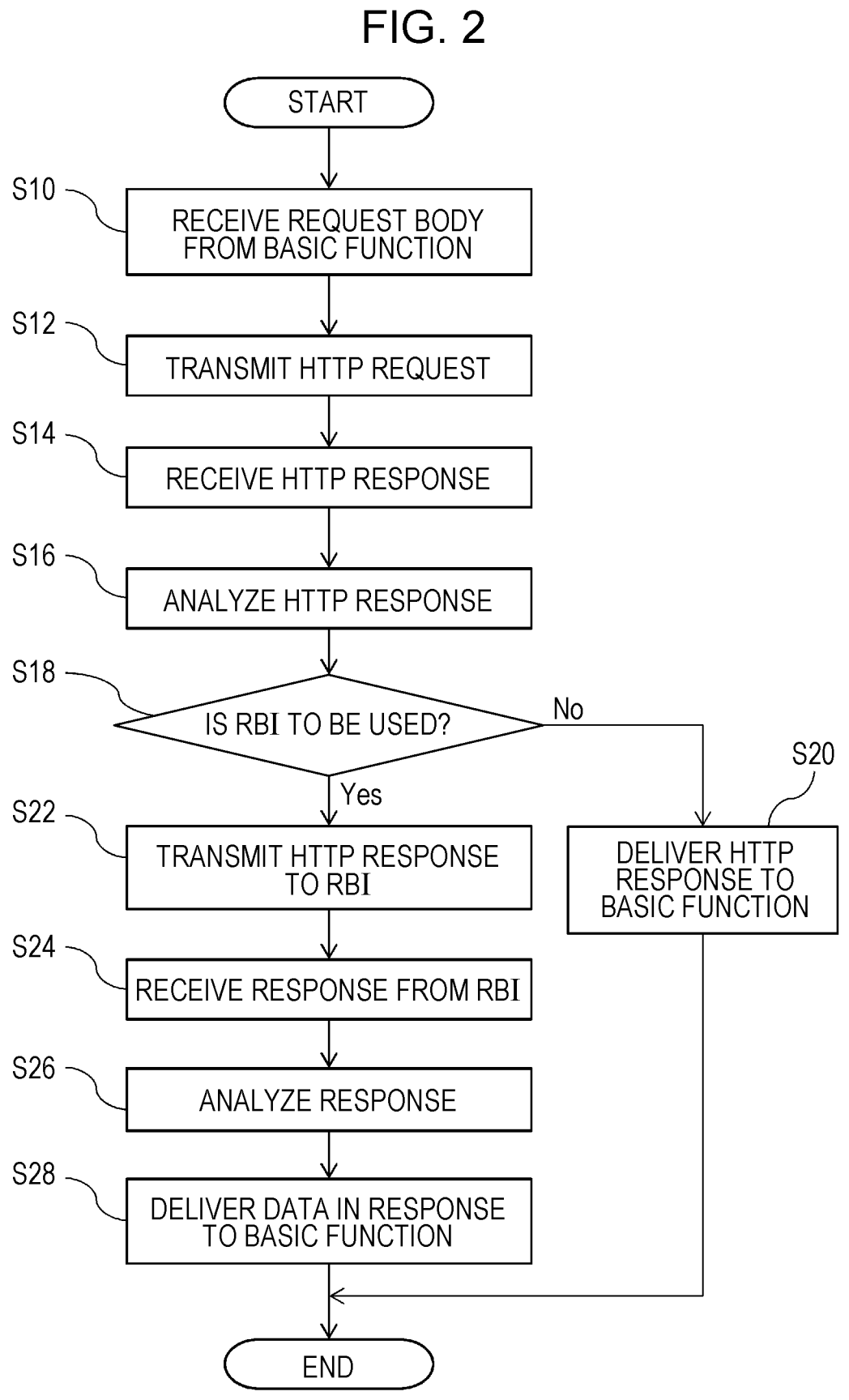

START

S10 — RECEIVE REQUEST BODY FROM BASIC FUNCTION

S12 — TRANSMIT HTTP REQUEST

S14 — RECEIVE HTTP RESPONSE

S16 — ANALYZE HTTP RESPONSE

S18 — IS RBI TO BE USED?

No

S20 — DELIVER HTTP RESPONSE TO BASIC FUNCTION

Yes

S22 — TRANSMIT HTTP RESPONSE TO RBI

S24 — RECEIVE RESPONSE FROM RBI

S26 — ANALYZE RESPONSE

S28 — DELIVER DATA IN RESPONSE TO BASIC FUNCTION

END 100                  102

```
HTTP/1.1 200 OK
Content-Length: 1000
Content-Type: image/jpeg
{## BINARY DATA (ENTITY OF IMAGE DATA THAT MAY BE
ANALYZED BY BASIC FUNCTION 17)}
```

```
HTTP/1.1 200 OK
Content-Length: 1000
Content-Type: text/html
<!DOCTYPE html>
<head>
<script type="text/javascript">
    ## STATEMENT IN javascript CODE (THAT MAY NOT BE
    ANALYZED BY BASIC FUNCTION 17)
</script>
</head>
<body>
</body>
</html>
```

```
HTTP/1.1 200 OK
Content-Length: 1000
Content-Type: application/json; charset=utf-8
{
"user_code":"EXAMPLE_USER_CODE",
"device_code":"EXAMPLE_DEVICE_CODE",
"verification_uri":"https://example.com/devicelogin",
"expires_in":900,
"interval":5,
"message":"To sign in, use a web browser to open the page
https://example.com/devicelogin and enter the code
EXAMPLE_USER_CODE to authenticate."
}
```

122

INFORMATION PROCESSING APPARATUS, METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-148711 filed Sep. 20, 2022.

BACKGROUND

(i) Technical Field

The present disclosure relates to an information processing apparatus, a method, and a non-transitory computer readable medium.

(ii) Related Art

There are systems called "remote browser isolation (RBI)". An RBI system is provided between a client terminal and a website, and removes a security threat by analyzing a webpage provided by the website and converts the webpage into an image to be provided to the client terminal. A web browser (hereinafter simply referred to as a "browser") on the client terminal displays the image, and sends information such as a coordinate on the image at which a user clicks and characters input by the user to the RBI system. The RBI system sends the information sent from the browser to the website after changing the information into a format for input to the webpage.

Japanese Unexamined Patent Application Publication No. 2011-145918 discloses a system in which a proxy server corrects a HyperText Markup Language (HTML) source included in a response from a website and returns the corrected HTML source to a web browser. In this system, the proxy server corrects the HTML source so as not to cause an erroneous operation of a web application.

SUMMARY

In recent years, there have been an increasing number of examples in which an information processing apparatus such as a multi-function device uses a web service such as a cloud service provided outside the information processing apparatus. For example, log-in authentication for the information processing apparatus is performed using an external single sign-on authentication service.

On the other hand, software that processes HTML such as a browser installed in the information processing apparatus often may not be updated or is not updated even if the software may be updated. Therefore, the information processing apparatus may not be able to support a web service that uses the latest web technology.

It is conceivable to use the RBI technology in order to address such an issue. That is, a conversion device such as the RBI provided between an information processing apparatus and a website provides a HyperText Transfer Protocol (HTTP) response from the website to the information processing apparatus after converting the HTTP response into a form that may be handled by the information processing apparatus.

The RBI itself is a technology for protecting a client terminal from a security threat, and thus all the HTTP responses from the website to the client terminal pass by way of the RBI system.

A single information processing apparatus occasionally uses a plurality of web services, and software of the information processing apparatus is able to handle some of the HTTP responses from the web services, and is not able to handle the others. If the HTTP responses that may be handled by the software pass by way of the conversion device, a delay may be caused in information processing executed by the information processing apparatus for the process by the conversion device, which reduces the efficiency of the process by the information processing apparatus.

Aspects of non-limiting embodiments of the present disclosure relate to suppressing a reduction in the efficiency of the process by an information processing apparatus due to the intervention of a conversion device, compared to a system in which all the HTTP responses to HTTP requests from an information processing apparatus are provided to the information processing apparatus after being converted by a conversion device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: transmit a HyperText Transfer Protocol (HTTP) request that matches a request from a requesting entity to a first external service, and receive an HTTP response to the HTTP request; and switch, on a basis of data included in the HTTP response, whether to deliver the HTTP response to the requesting entity or to deliver data obtained by an external conversion device converting the HTTP response to the requesting entity.

BRIEF DESCRIPTION OF THE DRAWINGS

An exemplary embodiment of the present disclosure will be described in detail based on the following figures, wherein:

FIG. 2 illustrates an example of process procedures executed by a web client separation function;

FIG. 5 illustrates another specific example of an HTTP response;

FIG. 6 illustrates still another specific example of an HTTP response;

DETAILED DESCRIPTION

An exemplary embodiment of the present disclosure will be described below with reference to the drawings.

Figure 1:
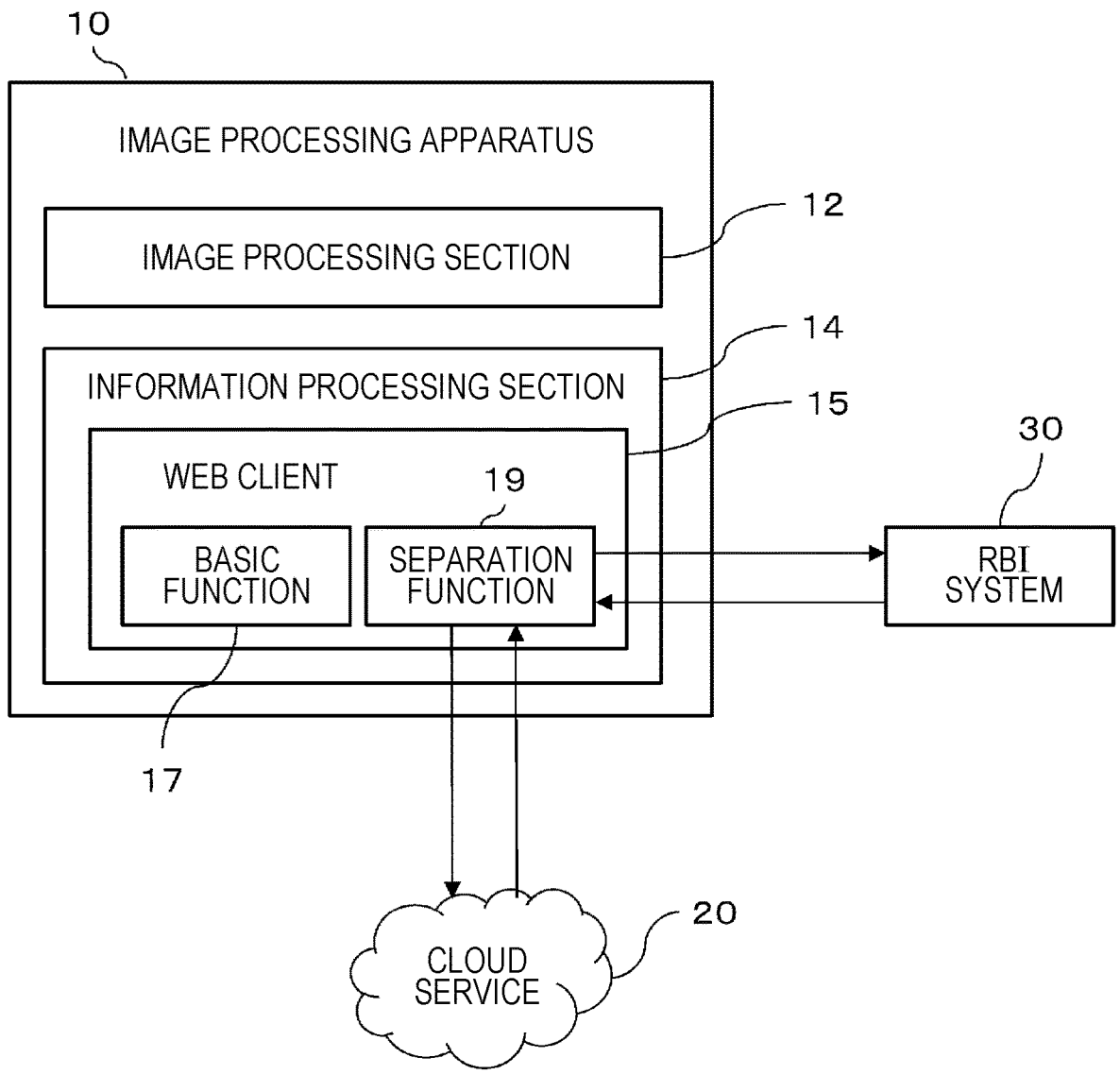
FIG. 1 illustrates an example of the functional configuration of an image processing apparatus and the configuration of an information processing system that includes the image processing apparatus.

FIG. 1 illustrates an example of the functional configuration of an image processing apparatus 10 according to an exemplary embodiment of the present disclosure and the configuration of an information processing system that includes the image processing apparatus 10.

In this system, the image processing apparatus 10 is connected to a cloud service 20 and a remote browser isolation (RBI) system 30 via a data communication network such as a local area network and the Internet.

The image processing apparatus 10 is a device that has at least one of a print function, a scan function, and a copy function and that provides such functions to a user, for example. The image processing apparatus 10 may be a printer, a scanner, a copier, a multi-function device (e.g. a device that has a print function, a scan function, a copy function, etc.), etc.

The image processing apparatus 10 includes an image processing section 12 and an information processing section 14 as functional constituent elements.

The image processing section 12 is a functional module that executes processes such as printing an image on a medium and reading an image on a medium, such as print, scan, and copy. The image processing section 12 includes hardware for image processing such as a print or a scanner.

The information processing section 14 is a functional module that executes various information processing such as controlling the image processing section 12, information processing associated with an image processing function of the image processing section 12, and a user interface (UI) process. Examples of the information processing associated with an image processing function of the image processing section 12 include managing a job such as print and scan indicated by a user, information processing on a scan image obtained through scanning, processing and editing of a document or an image to be printed, etc. Examples of the information processing on a scan image include a character recognition process, translating the character recognition result, a process of entering data into forms, etc.

The information processing section 14 occasionally uses an external service such as the cloud service 20 in order to execute information processing. For example, the information processing section 14 transmits a scan image to the cloud service 20 which provides a character recognition service, receives the character recognition result from the cloud service, and generates a document file that includes the character recognition result. In another example, the information processing section 14 requests the cloud service 20 which provides a user authentication service to authenticate a user that attempts to use the image processing apparatus 10, in order to authenticate the user. These are merely exemplary, and the information processing section 14 may use a variety of different cloud services 20.

The information processing section 14 includes a web client 15. The web client 15 is client software that uses a service on the World Wide Web (WWW). The web client 15 communicates with an external service such as the cloud service 20 using the HyperText Transfer Protocol (HTTP) or the HyperText Transfer Protocol Secure (HTTPS) which is a securer protocol. The web client 15 transmits an HTTP request to the cloud service 20, receives an HTTP response to the HTTP request from the cloud service 20, and executes a process that matches the response. Examples of the web client 15 include a web browser and an application that executes information processing in coordination with the web-based cloud service 20. The former web browser generates a UI screen of the image processing apparatus 10, for example. The latter application performs user authentication through collaborative authentication with the cloud service 20 which provides a user authentication service, for example. In another example, the application allows downloading and printing a print job registered in the cloud service 20 which provides a cloud print service.

The web client 15 includes a basic function 17 and a separation function 19. Among these, the basic function 17 is a function provided to the user by the web client 15, and examples of the basic function 17 include the web browser function discussed above and various processing functions (e.g. user authentication and cloud print) provided in coordination with the cloud service 20. The basic function 17 is an example of the requesting entity that makes a request for an external service such as the cloud service 20.

The separation function 19 controls whether or not to use the RBI system 30 when the basic function 17 executes a process in coordination with the cloud service 20. The separation function 19 analyzes the HTTP response returned from the cloud service 20 using a built-in HTTP parser, and executes control on the basis of the analysis result. The separation function 19 will be described in detail later.

The cloud service 20 is a server that provides a web-based service to the image processing apparatus 10 via a network such as the Internet. The cloud service 20 is an example of an external service that processes an HTTP request from the web client 15 and that returns an HTTP response.

While only one cloud service 20 is illustrated in the drawing, a plurality of different cloud services 20 may be present such as one that provides an authentication service and one that provides a cloud print service. A web server that simply provides a group of web pages is also an example of the cloud service 20.

The RBI system 30 is an example of a conversion device, and converts an HTTP response returned from the cloud service 20 into a form that may be handled by the web client 15. The web client 15 installed in the image processing apparatus 10 is not always updated to a state that supports the latest web technology, and thus may not be able to appropriately process the HTTP response returned from the cloud service 20. The RBI system 30 converts an HTTP response that may not be appropriately processed by the web client 15 into data in a data format that may be processed by the web client 15 such as image data, for example. The data conversion function of the RBI system 30 may be the same as that of the RBI system known in the art.

Next, an example of a process executed by the separation function 19 will be described with reference to FIG. 2.

The basic function 17 generates a body portion of an HTTP request for a process in the case where the process is executed using a certain cloud service 20, and delivers the generated body portion to the separation function 19. The separation function 19 receives the request body (S10), and transmits an HTTP request such as GET or POST including the request body to the cloud service 20 as a requested entity (S12).

The cloud service 20 receives and processes the HTTP request, and returns an HTTP response that includes data on the processing result to the separation function 19.

The separation function 19 receives the HTTP response returned from the cloud service 20 (S14). Then, the separation function 19 analyzes the data included in the HTTP response (S16), and determines on the basis of the analysis result whether or not the HTTP response is to be processed by the RBI system 30 (S18). That is, the separation function 19 determines on the basis of the content of the data in the HTTP response whether or not the basic function 17 is able to correctly process the HTTP response, and in the case where it is determined that the data may not be processed correctly, delivers the HTTP response to the RBI system 30 and causes the RBI system 30 to convert the data into data in a format that may be handled by the basic function 17. The analysis and determination processes will be described in detail later.

In the case where it is determined in S18 that the HTTP response is not to be processed by the RBI system 30 (i.e. in the case where the result of the determination in S18 is No), the HTTP response as it is may be correctly processed by the basic function 17. In this case, the separation function 19 delivers the HTTP response to the basic function 17 (S20). The basic function 17 executes a predetermined process (such as displaying a UI screen and executing print, for example) using the received HTTP response.

In the case where it is determined in S18 that the HTTP response is to be processed by the RBI system 30 (i.e. in the case where the result of the determination in S18 is Yes), the separation function 19 transmits the HTTP response to the RBI system 30 (S22). This transmission may be performed using a POST request, for example. The RBI system 30 converts the received HTTP response into data that may be handled by the basic function 17, and returns a response that includes data that result from the conversion to the separation function 19. This response is constituted of a header for a protocol (e.g. IP or TCP) other than the HTTP, an HTTP header, and an EntityBody. The EntityBody includes the result of the conversion by the RBI system 30 (i.e. the HTTP response sent by the separation function 19 in S22 and converted by the RBI system 30).

The separation function 19 receives a response from the RBI system 30 (S24), and analyzes data included in the response (S26). The EntityBody in the response is extracted in this analysis. The separation function 19 delivers information that is necessary to use the basic function 17 such as a service name and a user name and data in the EntityBody extracted in S26 to the basic function 17 (S28). The delivered data are data that may be handled by the basic function 17. The basic function 17 executes a predetermined process using the received data.

In S28, the basic function 17 occasionally generates a UI screen using the response from the RBI system 30, displays the UI screen on a display device of the image processing apparatus 10, and receives input to the UI screen from the user. In this case, the input information is transmitted to the cloud service 20 after being converted by the RBI system 30 into data in a format requested by the cloud service 20.

Next, a detailed example of the process in S16 will be described with reference to FIG. 3.

In this example, roughly speaking, the separation function 19 determines that the HTTP response received from the cloud service 20 in S14 should be converted by the RBI system 30 in the case where the HTTP response corresponds to at least one of the two following cases.

In a first case, the data included in the HTTP response are data of a type that is not appropriately processable by the basic function 17. For example, a case where the basic function 17 does not support javascript (registered trademark) or supports an old version of javascript is considered. In this case, the basic function 17 may not be able to, or is highly likely not able to, correctly process an HTTP response that includes a statement in javascript. Thus, in such a case, the RBI system 30 converts the HTTP response so as to have a data content that may be handled by the basic function 17.

In a second case, access to a different server other than the cloud service 20 is required to process an HTTP response. For example, there is a case where an HTTP response includes an instruction that requests user authentication by a specific collaborative authentication service on the Internet but the basic function 17 does not support such an instruction, the collaborative authentication service is not available, etc. In such a case, the RBI system 30 mediates between the basic function 17 and the collaborative authentication service. In this manner, the intervention of the RBI system 30 is required in the case where an HTTP response includes a statement that requires access to a different server.

Figure 3:
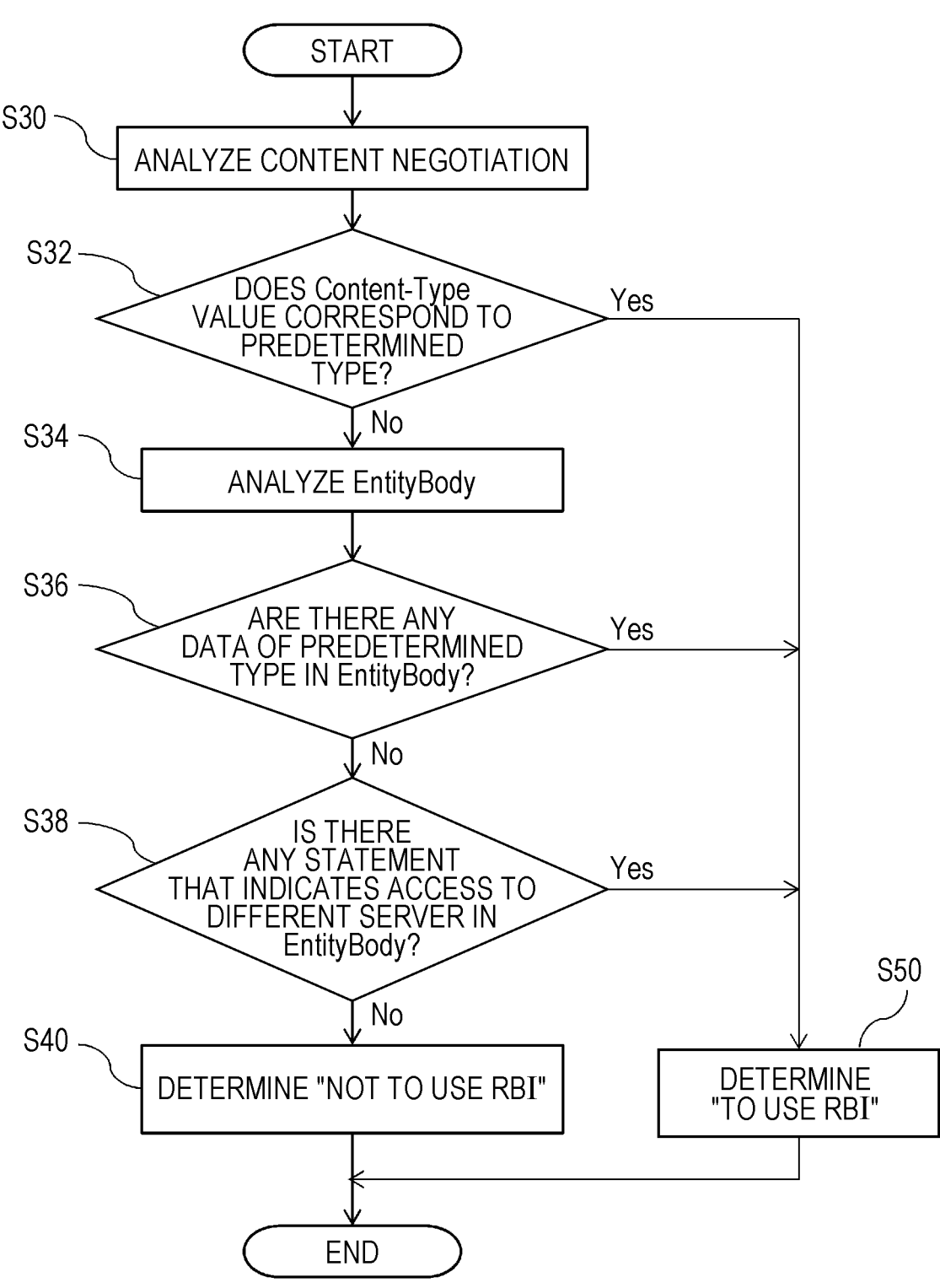
FIG. 3 illustrates an example of detailed process procedures in S16 in the process procedures in FIG. 2.

FIG. 3 illustrates a specific example of a case separation process by the separation function 19.

In this procedure, the separation function 19 analyzes a statement for content negotiation in the HTTP response received from the cloud service 20 in S14 to check the type of data indicated by the statement (S30). At this time, the separation function 19 checks the value of a Content-Type in the header of the HTTP response, for example. It is determined whether or not the value corresponds to any of predetermined data types that require use of the RBI system 30 (S32). In the case where the result of the determination is Yes, the separation function 19 determines to use the RBI system 30 (S50). In the case where a plurality of data types are mentioned in the statement for content negotiation, the result of the determination in S32 is Yes if at least one of the plurality of data types requires use of the RBI system 30. In the case where none of the plurality of data types corresponds to any of the data types that require use of the RBI system 30, conversely, the result of the determination in S32 is No.

In the case where the result of the determination in S32 is No, the separation function 19 analyzes the content of the Entitybody of the HTTP response (S34).

In the analysis in S34, the separation function 19 checks the data type stated in tags for elements in the EntityBody, for example. For example, in the case where the basic function 17 is not able to appropriately process a script language such as javascript, data stated in the script language correspond to a data type that requires use of the RBI system 30. Data in a script language are indicated by a script tag in the HTML, and thus it is considered that script language data are included if a script tag is provided in the EntityBody.

In the analysis in S34, it is checked whether or not the EntityBody includes an instruction that requests communication with an external service outside the image processing apparatus 10. Examples of such an instruction include an instruction to access a Uniform Resource Locator (URL).

The separation function 19 determines through the analysis in S34 whether or not the EntityBody includes data corresponding to any of the predetermined data types that require use of the RBI system 30 (S36). The result of the determination in S36 is No in the case where the EntityBody does not include any data of the data types that require use of the RBI system 30, and the result of the determination in S36 is Yes in the other cases. In the case where the result of the determination in S36 is Yes, the separation function 19 determines to use the RBI system 30 (S50).

In addition, the separation function 19 determines on the basis of the result of the analysis in S34 whether or not the EntityBody includes an instruction for communication with an external service (S38). In the case where the result of the determination is Yes, the separation function 19 determines to use the RBI system 30 (S50). The result of the determination is reflected in the determination in S18 in the procedure in FIG. 2.

In the case where both the results of the determinations in S36 and S38 are No, the separation function 19 determines not to use the RBI (S40). The result of the determination is reflected in the determination in S18 in the procedure in FIG. 2.

In this manner, in the process procedure in FIG. 3, the separation function 19 determines whether or not to cause the RBI system 30 to process an HTTP response from the cloud service 20 on the basis of the header of the HTTP response and the statement in the EntityBody.

While it is determined in S32 and S36 in the procedure in FIG. 3 whether or not the HTTP response includes data corresponding to a data type that requires conversion by the RBI system 30, this is merely exemplary. Instead, it may be determined in S32 and S36 whether or not all the data included in the HTTP response correspond to a data type that may be processed by the basic function 17 (i.e. that does not need to be converted by the RBI system 30). In this case, the separation function 19 proceeds to S50 and determines to use the RBI system 30 in the case where at least one of the results of the determinations is No (i.e. the HTTP response includes one or more data that do not correspond to data types that may be processed by the basic function 17).

The determination in the procedure in FIG. 3 will be further described with reference to a specific example of the HTTP response.

Figure 4:
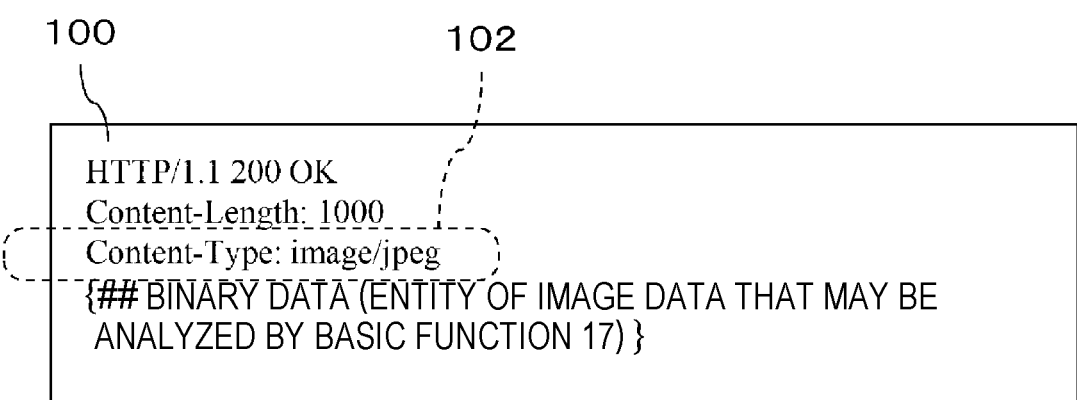
FIG. 4 illustrates a specific example of an HTTP response.

An HTTP response 100 illustrated in FIG. 4 includes a statement 102 indicating that the Content-Type which indicates content negotiation is "image/jpeg". The HTTP response 100 does not include any other statement of content negotiation that indicates a data type. The data type "image/jpeg" may be received and processed as it is by the basic function 17. Conversely, the Content-Type stated in the HTTP response 100 does not include a data type that requires conversion by the RBI system 30 to be handled by the basic function 17. Thus, the result of the determination in S32 for the HTTP response 100 is No. In addition, the EntityBody of the HTTP response 100 only includes binary data as the entity of the data of the data type "image/jpeg". Thus, the results of the determinations in S36 and S38 are also No, and it is determined in S40 "not to use the RBI system 30" for the HTTP response 100. Thus, the separation function 19 delivers the HTTP response 100 to the basic function 17 in S20 in the procedure in FIG. 2.

An HTTP response 110 illustrated in FIG. 5 includes an element 112 indicated by a script tag in the EntityBody. In the case where data stated in a script language are prescribed to have a data type that requires conversion by the RBI system 30, the result of the determination in S36 for the HTTP response 110 is Yes. Thus, the separation function 19 determines in S50 to "use the RBI system 30" for the HTTP response 100, and executes the processes in S22 to S28 in the procedure in FIG. 2.

An HTTP response 120 illustrated in FIG. 6 includes a statement 122 that provides an instruction to receive end-user verification at a verification Uniform Resource Identifier (URI) "https://example.com/devicelogin" in the EntityBody. Thus, the result of the determination in S38 for the HTTP response 120 is Yes. Thus, the separation function 19 determines in S50 that the HTTP response 120 "uses the RBI system 30", and executes the processes in S22 to S28 in the procedure in FIG. 2.

Next, a modification of the process procedure by the separation function 19 will be described with reference to FIG. 7. While the process is ended after S20 in the procedure illustrated in FIG. 2, steps S60 to S68 are executed after S20 in the procedure illustrated in FIG. 7. Of the process procedure by the separation function 19 according to the modification, a portion other than the portion in and after S20 illustrated in FIG. 7 is the same as the procedure illustrated in FIG. 2.

Figure 7:
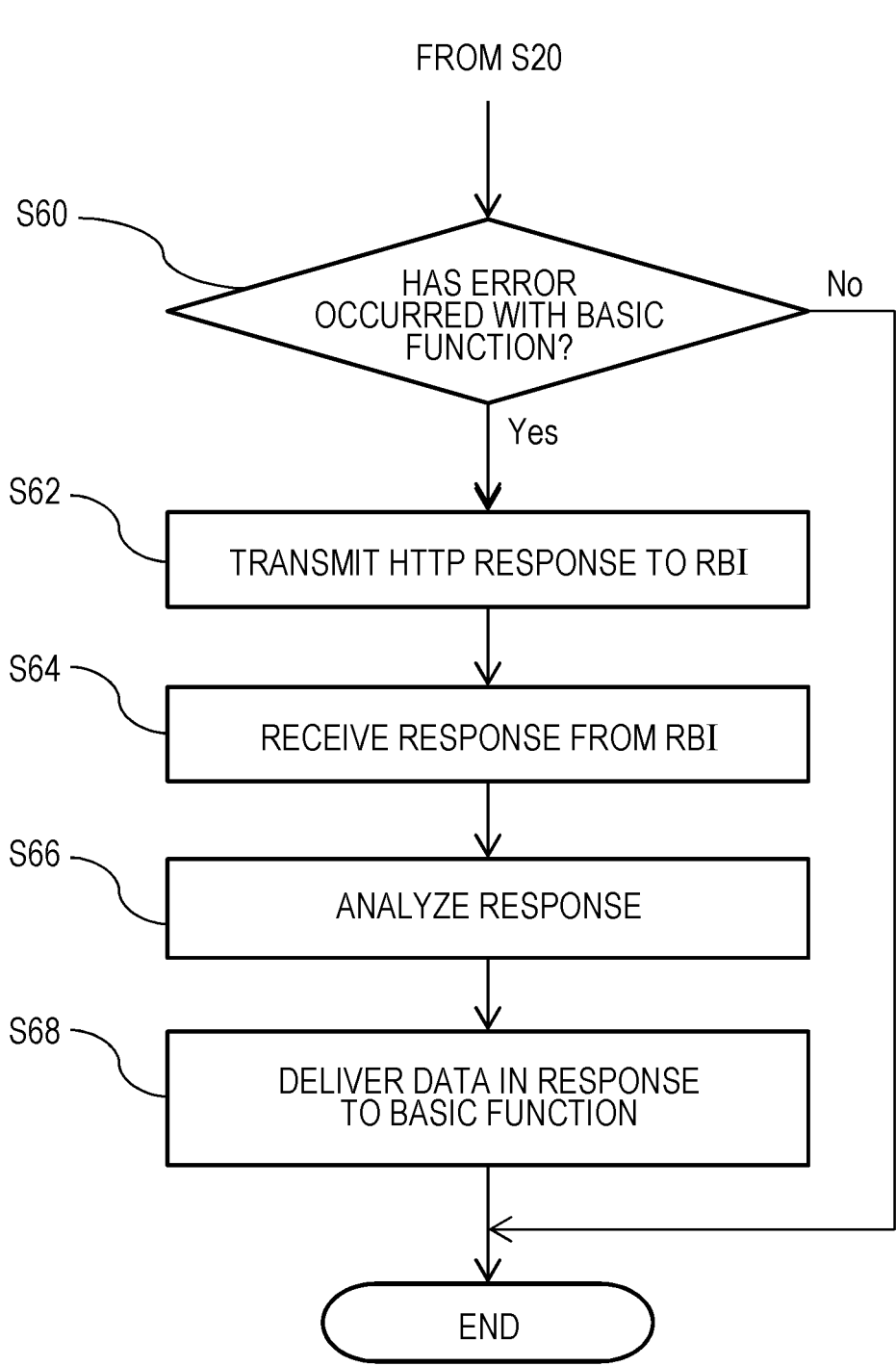
FIG. 7 illustrates a modification of the process procedures in FIG. 2.

That is, in the procedure illustrated in FIG. 7, the separation function 19 delivers an HTTP response returned from the cloud service 20 to the basic function 17 in S20, and thereafter determines whether or not an error has occurred in the basic function 17 in processing the HTTP response (S60). For example, the basic function 17 may notify the separation function 19 that an error has occurred in the case where an error has occurred in processing the HTTP response, and the separation function 19 may determine that an error has occurred in accordance with the notification.

In the case where the result of the determination in S60 is Yes, the separation function 19 transmits the HTTP response to the RBI system 30 (S62), and receives a response returned from the RBI system 30 in response to the transmission (S64). Then, the separation function 19 analyzes data included in the received response (S66), and delivers data (e.g. data in the EntityBody) obtained as a result of the analysis to the basic function 17 (S68). The basic function 17 executes a predetermined process using the received data.

The procedure in FIG. 2 is based on the assumption that there is no error in the analysis in S16 or the determination in S18. On the contrary, the procedure in FIG. 7 is also able to support a case where there is an error in the analysis or the determination. That is, the separation function 19 causes the RBI system 30 to convert an HTTP response from the cloud service 20 so as to have a data content that may be processed by the basic function 17 in the case where an error is caused as the basic function 17 is not able to correctly process the HTTP response.

EXAMPLE

An example of a specific instance will be described below.

In this example, a scene in which the status of use of the image processing apparatus 10 (e.g. a multi-function device) is managed by the cloud service 20 and a graph of a log analysis result that indicates the status of use is displayed on a screen of the image processing apparatus 10 is considered. It is assumed that the cloud service 20 provides the graph to the image processing apparatus 10 as data of a data type "HTML/javascript", but that the basic function 17 of the image processing apparatus 10 is not able to process javascript. The flow of a sequence of processes in this example will be described below.

(1) A user that has the authority to display a log analysis result logs in through an operation panel of the image processing apparatus 10 using a user name with the authority.

(2) The user selects a service named "log analysis result display service" from an operation menu displayed on the display panel, and provides an instruction to execute the service.

In response to the instruction, the basic function 17 provides an access request start notification for the cloud service 20 that provides the "log analysis result display service" to the separation function 19.

(3-1) The separation function 19 transmits an HTTP request that requests the "log analysis result display service" to the cloud service 20. At this time, information to be included in the HTTP request is provided from a function that manages information in the image processing apparatus 10 to the separation function 19. Such information includes information (e.g. a URL or a URI) that specifies the cloud service 20, credential information on the user to be presented to the cloud service 20, etc.

(3-2) The separation function 19 receives an HTTP response to the HTTP request from the cloud service 20. The header of the HTTP response includes information on content negotiation that indicates the type of data included in the response. The EntityBody of the HTTP response includes data on a graph of the log analysis result represented in the "HTML/javascript" format.

(3-3) The separation function 19 analyzes the HTTP response using a built-in HTTP parser, and extracts necessary information such as a service name and a data type. Then, it is determined using the extracted information whether the HTTP response is to be delivered as it is to the basic function 17 or the HTTP response is to be converted by the RBI system 30 and the result of the conversion is to be delivered to the basic function 17 (e.g. the process procedure in FIG. 3).

(4-1) In the case where the HTTP response is to be converted by the RBI system 30 as a result of the determination, the separation function 19 transmits the HTTP response discussed above and the service name extracted from the HTTP response to the RBI system 30.

(4-2) The RBI system 30 converts the graph represented in "HTML/javascript" in the received HTTP response into data in an image format that may be handled by the basic function 17. Then, the image data that result from the conversion are returned to the separation function 19 in correlation with the service name discussed above.

(4-3) The separation function 19 receives the image data and the service name from the RBI system 30, and delivers the image data and the service name to the basic function 17.

(5) The browser which is a part of the basic function 17 displays the image data in a portion of a webpage corresponding to the service name. Consequently, the graph of the log analysis result is displayed on the screen.

Figure 8:
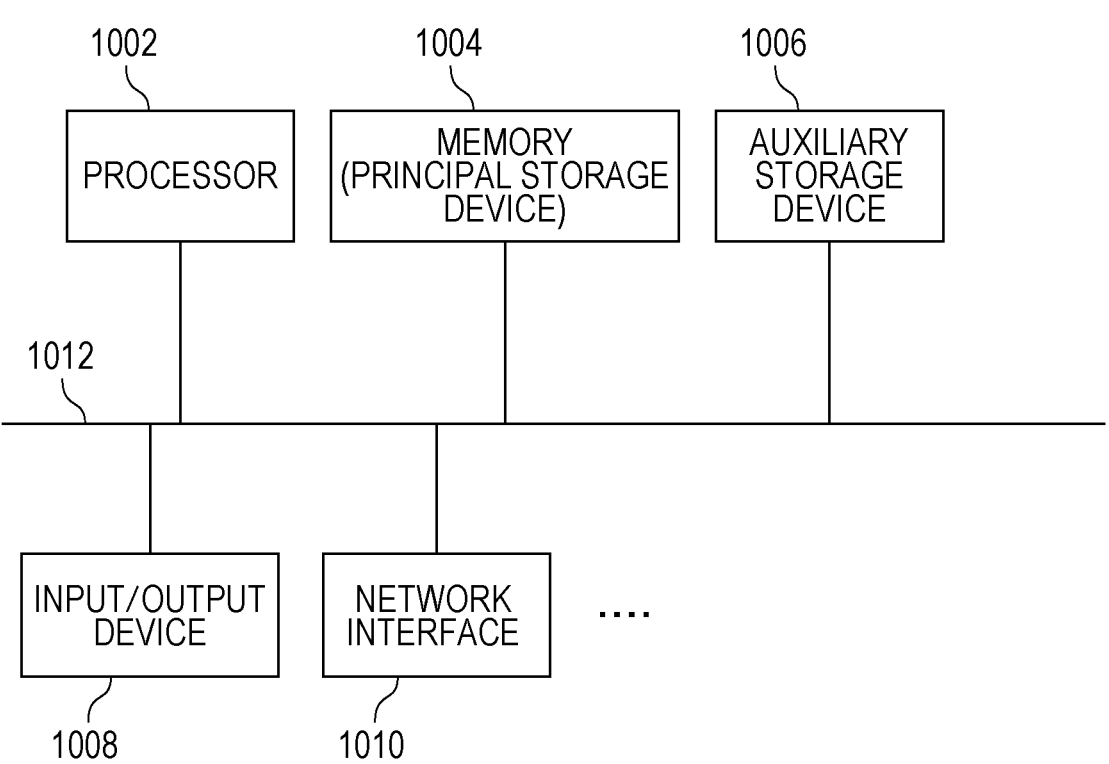
FIG. 8 illustrates an example of the hardware configuration of a computer.

The information processing section 14 of the image processing apparatus 10 according to the exemplary embodiment described above is constituted using a general-purpose computer, for example. As illustrated in FIG. 8, for example, the computer has a circuit configuration in which a controller that controls a processor 1002, a memory (principal storage device) 1004 such as a random access memory (RAM), and an auxiliary storage device 1006 which is a non-volatile storage device such as a flash memory, a solid state drive (SSD), and a hard disk drive (HDD), an interface with various input/output devices 1008, a network interface 1010 that performs control for connection with a network such as a local area network, etc. are connected to each other via a data transmission path such as a bus 1012, for example. A program that describes the content of the processes according to the above exemplary embodiment is installed in the computer by way of the network etc., and stored in the auxiliary storage device 1006. The information processing section 14 according to the present exemplary embodiment is constituted by the program stored in the auxiliary storage device 1006 being executed by the processor 1002 using the memory 1004.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX ((( 1 )))

An information processing apparatus comprising:

a processor configured to:

transmit a HyperText Transfer Protocol (HTTP) request that matches a request from a requesting entity to a first external service, and receive an HTTP response to the HTTP request; and switch, on a basis of data included in the HTTP response, whether to deliver the HTTP response to the requesting entity or to deliver data obtained by an external conversion device converting the HTTP response to the requesting entity.

((( 2 )))

The information processing apparatus according to ((( 1 ))), wherein the processor is configured to deliver the data obtained by the conversion device converting the HTTP response to the requesting entity in a case where the HTTP response includes data of a type that is not processable by the requesting entity.

((( 3 )))

The information processing apparatus according to ((( 1 ))), wherein the processor is configured to deliver the HTTP response to the requesting entity in a case where the HTTP response does not include data of a type that is not processable by the requesting entity.

((( 4 )))

The information processing apparatus according to any one of ((( 1 ))) to ((( 3 ))), wherein the processor is configured to deliver the data obtained by the conversion device converting the HTTP response to the requesting entity in a case where the HTTP response includes a statement indicating that communication with a second external service that is different from the first external service is to be performed.

((( 5 )))

The information processing apparatus according to any one of ((( 1 ))) to ((( 4 ))), wherein the processor is configured to cause the conversion device to convert the HTTP response and deliver resulting data to the requesting entity in a case where the HTTP response is delivered to the requesting entity and an error is caused in a process about the HTTP response at the requesting entity.

(((6)))

A program causing a computer to execute a process comprising:

transmitting a HyperText Transfer Protocol (HTTP) request that matches a request from a requesting entity to a first external service, and receiving an HTTP response to the HTTP request, and switching, on a basis of data included in the HTTP response, whether to deliver the HTTP response to the requesting entity or to deliver data obtained by an external conversion device converting the HTTP response to the requesting entity.

What is claimed is:

1. An information processing apparatus comprising:

a processor configured to:

transmit a HyperText Transfer Protocol (HTTP) request that matches a request from a requesting entity to a first external service, and receive an HTTP response to the HTTP request; and in response to receiving the HTTP response from the first external service, analyze data included in the HTTP response and:

when the data satisfies a first condition, deliver the HTTP response directly to the requesting entity without conversion; and when the data satisfies a second condition, transmit the HTTP response to an external conversion device separate from the information processing apparatus, receive converted data from the external conversion device, and deliver the converted data to the requesting entity.

2. The information processing apparatus according to claim 1, wherein the processor is configured to deliver the data obtained by the conversion device converting the HTTP response to the requesting entity in a case where the HTTP response includes data of a type that is not processable by the requesting entity.

3. The information processing apparatus according to claim 1, wherein the processor is configured to deliver the HTTP response to the requesting entity in a case where the HTTP response does not include data of a type that is not processable by the requesting entity.

4. The information processing apparatus according to claim 1, wherein the processor is configured to deliver the data obtained by the conversion device converting the HTTP response to the requesting entity in a case where the HTTP response includes a statement indicating that communication with a second external service that is different from the first external service is to be performed.

5. The information processing apparatus according to claim 1, wherein the processor is configured to cause the conversion device to convert the HTTP response and deliver resulting data to the requesting entity in a case where the HTTP response is delivered to the requesting entity and an error is caused in a process about the HTTP response at the requesting entity.

6. A method comprising:

transmitting a HyperText Transfer Protocol (HTTP) request that matches a request from a requesting entity to a first external service, and receiving an HTTP response to the HTTP request; and in response to receiving the HTTP response from the first external service, analyzing data included in the HTTP response and:

when the data satisfies a first condition, delivering the HTTP response directly to the requesting entity without conversion; and when the data satisfies a second condition, transmitting the HTTP response to an external conversion device separate from the information processing apparatus, receiving converted data from the external conversion device, and delivering the converted data to the requesting entity.

7. A non-transitory computer readable medium storing a program causing a computer to execute a process comprising:

transmitting a HyperText Transfer Protocol (HTTP) request that matches a request from a requesting entity to a first external service, and receiving an HTTP response to the HTTP request; and in response to receiving the HTTP response from the first external service, analyzing data included in the HTTP response and:

when the data satisfies a first condition, delivering the HTTP response directly to the requesting entity without conversion; and when the data satisfies a second condition, transmitting the HTTP response to an external conversion device separate from the information processing apparatus, receiving converted data from the external conversion device, and delivering the converted data to the requesting entity.

* * * * *